K. TAKANO.
SAW.
APPLICATION FILED NOV. 15, 1919.
1,351,499.
Patented Aug. 31, 1920.
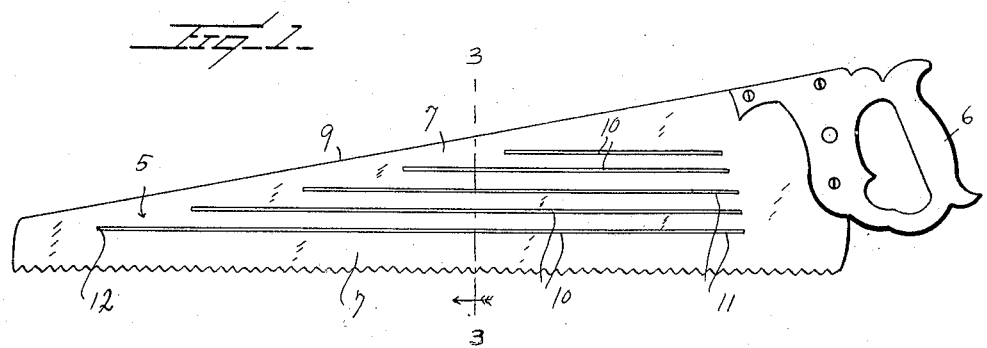
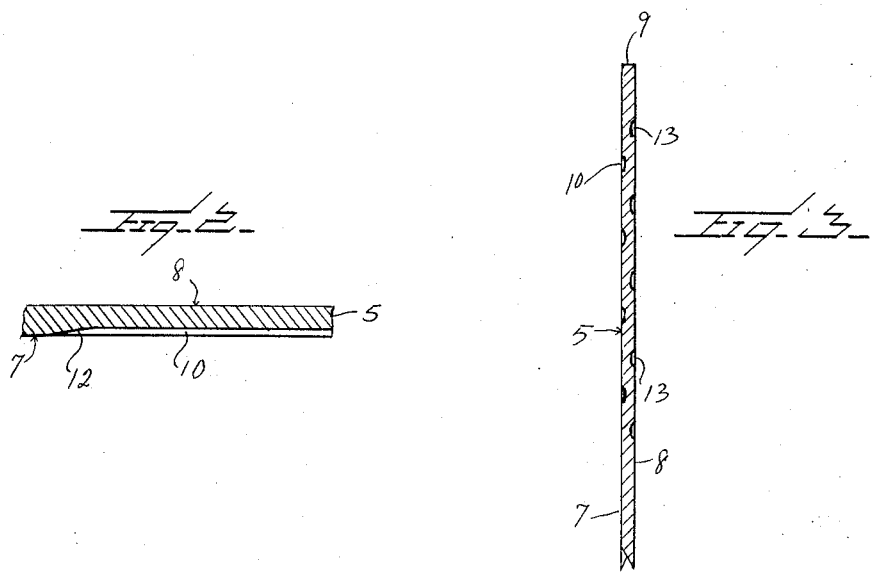
Inventor
Kiyoshi Takano
By Watson E. Coleman
Attorney

UNITED STATES PATENT OFFICE.

KIYOSHI TAKANO, OF HONOLULU, TERRITORY OF HAWAII.

SAW.

1,351,499.   Specification of Letters Patent.   Patented Aug. 31, 1920.

Application filed November 15, 1919. Serial No. 338,221.

*To all whom it may concern:*

Be it known that I, KIYOSHI TAKANO, a subject of the Emperor of Japan, residing at Honolulu, in the county of Honolulu and Territory of Hawaii, have invented certain new and useful Improvements in Saws, of which the following is a specification, reference being had to the accompanying drawings.

This invention relates to saws and particularly to a saw constructed to eliminate friction.

The disadvantage of the solid surface saw is that in the sawing operation the continual rubbing of the sides of the saw with the material not only generates heat which is injurious to the saw but causes friction, which greatly interferes with the sawing operation. In addition to this, any lubricant that is applied to the sides of the saw is entirely removed after a few strokes of the saw through the material.

It is therefore an object of this invention to provide a saw having a plurality of shallow grooves, which permit the escape of heat generated in the sawing operation, and at the same time to eliminate friction between the saw and the material.

Another object is to provide a plurality of grooves in the saw arranged to retain indefinitely the lubricant applied to the saw and to permit circulation of the lubricant in the grooves.

Another object of the invention is to provide a saw having a plurality of grooves in one side arranged in staggered relation to a plurality of grooves in the other side, to retain the original strength of the saw.

A still further object of the invention is to provide a saw having a plurality of grooves in each side thereof, each groove being arranged to operate alternately to the adjacent groove in the other side of the saw, to eliminate friction and permit the escape of heat.

These objects are attained by the mechanism illustrated in the accompanying drawing, in which—

Figure 1 is a side elevation of a saw showing the graduation of the grooves;

Fig. 2 is a fragmentary longitudinal sectional view of the saw and one of the grooves, showing the end wall of the groove; and Fig. 3 is a sectional view on the line 3—3 of Fig. 1.

Referring to the drawings, 5 indicates a saw having the conventional handle 6. It will, of course, be understood that I do not limit myself to this type of saw, as my invention can be incorporated in all types of saws. The saw 5 includes sides 7 and 8 and a back 9. Formed in the side 7 in spaced relation to the ends, back and teeth of the saw and to each other, is a plurality of shallow narrow grooves 10. Each groove extends longitudinally of the saw and has its ends 11 terminating flush with the side surface of the saw adjacent the back and ends thereof, the ends of the grooves providing resultant inclined end walls 12. The purpose of terminating the ends 11 of the grooves before the groove reaches the back or end of the saw is to prevent any lubricant applied to the saw from escaping at the ends of the grooves and at the same time to prevent weakening of the saw structure at its edges. To provide additional strength to the saw, each groove is graduated according to the form or construction of the saw, so that a relatively equal margin is provided around the edge of the saw.

Grooves 13 of similar construction and purpose are formed in the side 8 of the saw, and are positioned in staggered relation to the groove 10 in the side 7 of the saw, so that one groove 10 is disposed on the opposite side of the saw between the space separating the grooves 13, and vice versa. This feature not only permits alternating operation of the grooves, but does not decrease the strength of the saw. By this novel arrangement, a plurality of grooves can be formed in the sides of the saw without decreasing its strength or weakening it in any manner, and at the same time they permit the escape of heat generated by the saw, eliminate friction, retain indefinitely any lubricant applied to the saw and permit the sawing operation to be accomplished with greater ease and rapidity than was possible before.

What is claimed is:

1. A saw having a plurality of grooves in each side thereof arranged to hold lubricant, said grooves being of graduating lengths, the ends of said grooves terminating adjacent the edges of the saw.

2. A saw having a plurality of grooves, said grooves being of graduating lengths, each end portion of the bottom of each groove merging with the face of the saw.

3. A saw having a plurality of grooves, said grooves being of graduating lengths, each end portion of the bottom of each groove inclining upwardly longitudinally of the groove and terminating at the face of the saw.

In testimony whereof I hereunto affix my signature.

KIYOSHI TAKANO.